United States Patent [19]

Ito

[11] Patent Number: 5,990,825
[45] Date of Patent: Nov. 23, 1999

[54] POSITIONING SYSTEM AND FIXED STATION AND POSITIONING APPARATUS FOR EMPLOYING THE SAME

[75] Inventor: Toru Ito, Nagoya, Japan

[73] Assignee: Toyota Jidosha Kabushiki Kaisha, Toyota, Japan

[21] Appl. No.: 08/903,433

[22] Filed: Jul. 30, 1997

[30] Foreign Application Priority Data

Jul. 31, 1996 [JP] Japan ................................. 8-202007

[51] Int. Cl.$^6$ ............................................... G01S 05/02
[52] U.S. Cl. ............................................ 342/357; 701/215
[58] Field of Search ............................ 342/357; 701/215

[56] References Cited

U.S. PATENT DOCUMENTS

| | | |
|---|---|---|
| 5,477,228 | 12/1995 | Tiwari et al. . |
| 5,477,458 | 12/1995 | Loomis ................................ 342/357 X |
| 5,510,798 | 4/1996 | Bauer . |
| 5,589,835 | 12/1996 | Gildea et al. . |
| 5,638,077 | 6/1997 | Martin ................................ 342/357 |

FOREIGN PATENT DOCUMENTS

| | | |
|---|---|---|
| 0 574 009 | 12/1993 | European Pat. Off. . |
| 44 24 412 | 1/1996 | Germany . |
| 5-27005 | 2/1993 | Japan . |
| 6-51048 | 2/1994 | Japan . |
| 6-16888 | 3/1994 | Japan . |

OTHER PUBLICATIONS

Tadao Hayashi, "The Principle and View of the Differential GPS", 1995, No. 315, pp. 184–199.

Bergstrom C: "Correction data for Navstar Global Positioning System transmitted in the RDS channel. Tachnical verification and implement in Sweden", IEE Colloquium 'RDS (Radio Data Services)' (Digest No. 1994/249), London, UK, Dec. 15, 1994, pp. 3/1–5, XP002047283.

A Development of D–GPS System From "Toyota Technical Revue" vol. 46, No. 1 May 1996, Toru Ito, pp. 38–44.

"FM Multi–Broadcasting DGPS Data Format Standard", Association of Radio Industries and Businesses, Jun. 1995.

*Primary Examiner*—Mark Hellner
*Attorney, Agent, or Firm*—Pillsbury Madison & Sutro LLP

[57] ABSTRACT

DGPS data obtained from an FM broadcast wave is extracted by a DGPS data extraction section (226). Adjustment error, the accuracy of which is not very high, has been appended to correction data to be used in actual positioning correction within the obtained DGPS data. A correction value creation section (228) judges, from the contents of DGPS data, which data in a correction value table (230) may be read. The method of this judgment is predetermined. Then, the correction value is created by reading the corresponding correction value from correction value table (230). Next, the correction value and correction data are added in a DGPS data specifying section (232) to yield proper correction data. Position information having high accuracy can be obtained from the obtained proper correction data.

16 Claims, 6 Drawing Sheets

| BIT POSITION | DESCRIPTION (DESIGNATION) | | LENGTH |
|---|---|---|---|
| 1 | SCALE FACTOR | SF | 1 bit |
| 2~3 | USER DIFFERENTIAL RANGE ERROR | UDRE | 2 bit |
| 4~8 | SATELLITE ID | ST. ID | 5 bit |
| 9~19 | PSEUDO RANGE CORRECTION | PRC | 11 bit |
| 20~26 | RANGE-RATE CORRECTION | RRC | 7 bit |
| 27~34 | ISSUE OF DATA | IODE | 8 bit |

Fig. 3

POSITIONING SYSTEM AND FIXED STATION AND POSITIONING APPARATUS FOR EMPLOYING THE SAME

BACKGROUND OF THE INVENTION

1. Field of the Invention

The present invention relates to positioning systems, fixed station apparatus, and positioning apparatus for detecting the position of mobile stations based on satellite transmission information that is transmitted from artificial satellites and DGPS data that is transmitted from fixed terrestrial stations.

2. Description of the Related Art

Global Positioning System (GPS) apparatuses are used to detect the absolute position (latitude, longitude, altitude) of moving objects and have become indispensable in many applications, such as, for example, automobile navigation apparatuses. GPS is used by moving objects to detect their position based on satellite transmission information that is transmitted from a plurality of satellites.

However, the position detection based on the information received by GPS apparatus has a position detection accuracy of approximately several hundred meters, which is not very precise. For this reason, differential GPS (DGPS) has been proposed for increasing the accuracy by virtue of correction data, which reduces errors in the GPS positioning.

In DGPS, at a predetermined terrestrial location (i.e., fixed station) having an absolute position of confirmed accuracy, satellite transmission information is received from which the position of the receiver is detected (i.e., GPS positioned). By comparing the absolute position with the position obtained from GPS positioning, the error of the satellite transmission information is determined and correction data can, therefore, be supplied to the moving object to cancel the determined error.

The supply of correction data is performed through FM subcarrier broadcasts from FM broadcasting stations, where the FM subcarrier broadcasts have multiplex information (digital data) multiplexed in an ordinary 76 kHz FM broadcast band (a central frequency is 76 kHz). A moving object, such as a vehicle, receives the FM broadcasts on an FM multiplex receiver where the 76 kHz band signal is extracted from the received broadcast wave and is decoded to yield the multiplexed digital data. The correction data included in the multiplexed data is extracted, then used to correct the position information obtained at the GPS apparatus to yield position information having high accuracy. This sort of DGPS enables positions to be detected with an accuracy of a few meters.

There are instances where it is desirable to limit information provider services only to specific subscribing members. In this case, methods have been adopted which scramble information before it is provided. There scrambling methods render information completely unusable to those who are unable unscramble the information.

However, if the contents of services can be divided into levels according to the ranks of users, the degree of freedom in providing services increases so that services that meet the needs of users can be provided. For example, it would be convenient if the accuracy of correction data can be switched according to the rank of the user so that information meeting the rank of the user can be provided. In this manner, it is also possible to limit the positioning accuracy available to users when necessary.

SUMMARY OF THE INVENTION

In view of the above, it is an object of the present invention to provide a positioning system that can raise the positioning accuracy for specific users, and a fixed station apparatus and positioning apparatus for employing such a system.

In this invention, adjustment error is assigned to correction data. For this reason, the correction data cannot be corrected for users who do not have correcting means for correction data. In this case, the correction data includes error so that the best positioning accuracy cannot be obtained. The degree of positioning accuracy can be freely adjusted within a range of the error contained in GPS data. Therefore, the positioning accuracy for users can be controlled by dividing users into ranks and then providing them with correction data.

It is preferable to append an adjustment state, such as identification information, indicating whether the adjustment error was assigned. Based on this identification information, it is possible to recognize the necessity of correction and to perform the proper corrections. If the adjustment state identification information is made to contain a plurality of bits, the rank (degree) of adjustment can be determined from the adjustment state identification information.

Furthermore, modifying the adjustment error based on the data within DGPS data enables the randomness to be increased for more effective adjustment.

In this manner, the fixed station transmits DGPS data including the adjusted correction data. The mobile station then receives the DGPS data from the fixed station and, based on this, a correction value is obtained and used to restore the proper correction data. As such, the proper correction data is used so that position detection of the highest accuracy is performed. On the other hand, for a mobile station that is not configured for correcting correction data, the correction value cannot be obtained. In this case, the adjusted correction data is used directly and, although the accuracy is higher than when positioning with the GPS independently, the highest accuracy is not achieved. Varying the accuracy of the adjustment enables the accuracy to be lowered below that when measuring with GPS independently by using DGPS or to be left essentially unchanged.

In particular, according to this invention, DGPS services can be divided into ranks without scrambling. Furthermore, the positioning accuracy can also be lowered as necessary according to the needs of society.

BRIEF DESCRIPTION OF THE DRAWINGS

FIG. 3 shows the structure of correction data.

DETAILED DESCRIPTION OF THE PREFERRED EMBODIMENTS

A preferred embodiment (hereinafter called "embodiment") of the present invention is described in the following with reference to the drawings.

Overall System Configuration

Figure 1:
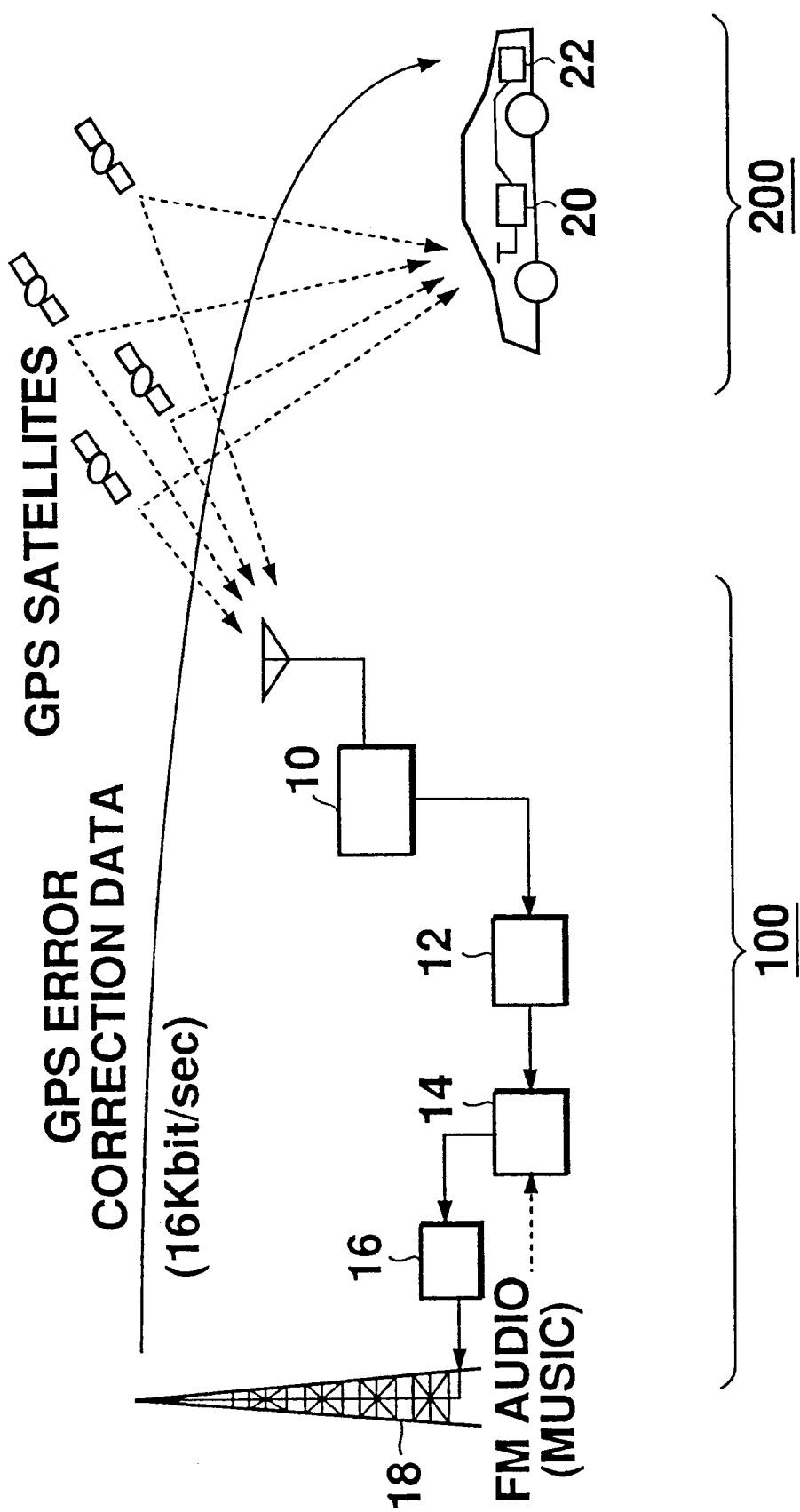
FIG. 1 shows the overall system configuration of an embodiment.

FIG. 1 shows an overall configuration of the system of this embodiment. The system comprises a fixed base station 100 and a mobile station 200. Base station 100 includes a fixed reference station 10, an organizer 12, a modulator 14, an FM transmitter 16, and an FM station transmitting antenna 18. Mobile station 200 includes a GPS antenna, a DGPS receiver 20, and an FM multiplex receiver 22. Fixed reference station 10 forms error calculating means for the fixed station, while organizer 12, modulator 14, FM transmitter 16, and FM station transmitting antenna 18 form transmitting means for the fixed station. Reference station 10 measures its own position by receiving radio waves from GPS satellites, and calculates the error between the measured data and its true position. For correction data in this embodiment, the error is not calculated for the detected positional coordinates, rather differences between the pseudorange, separation of each GPS satellite and reference station, and the true range are calculated. Then, based on the calculated differences, correction data is generated.

Reference station 10 detects the functional state of all satellites for output as health information to organizer 12. Organizer 12 formats the health information and correction data from reference station 10 into multiplexed Data Radio Channel (e.g., DARC) data for FM multiplexing. Modulator 14 modulates the DARC data from organizer 12 with a minimum shift keying (MSK) modulation method using a 76 kHz subcarrier and also modulates an ordinary FM audio signal. The modulator 14 then transmits the modulated DARC data with the modulated ordinary FM audio signal as FM subcarrier broadcasts through FM transmitter 16 and FM station transmitting antenna 18.

FM broadcast waves from fixed base station 100 are received by the FM multiplex receiver 22 at mobile station 200, where the ordinary FM audio signal is demodulated, the 76 kHz subcarrier is separated by a filter, and the fixed station information is demodulated for output to a DGPS receiver 20. DGPS receiver 20 corrects a positioning value from the positioning value based on the GPS radio wave received by the GPS antenna and the correction data and health information included in the fixed station information that was inputted from the FM multiplex receiver 22, to calculate the true or corrected position.

In the system of this embodiment, fixed base station 100 assigns a predetermined error (e.g., adjustment error) with respect to correction data to be transmitted, then adjusts this value. This adjustment method is predetermined and the method for restoring to original data is also known. Mobile station 200 corrects the correction data obtained from the FM subcarrier broadcast to a proper value, which is then used to correct the GPS positioning value. Therefore, only users who know the restoration method can perform DGPS positioning with a high degree of accuracy.

DGPS Data Structure

The format of the information including correction data for GPS error correction within the FM subcarrier broadcasts (i.e., DGPS data) is described next. The DGPS data is included in two data blocks within the FM multiplexed signal (272 data blocks) for one frame, which is sent in approximately 5 seconds. One data block comprises a block identification code, a data packet, and parity, and the data packet comprises a prefix, a packet, and cyclic redundancy check (CRC). The actual data of DGPS is held in a 144-bit packet, with two packets for 288 bits of data. In other words, DGPS data of 288 bits are sent in one frame.

Figure 2:
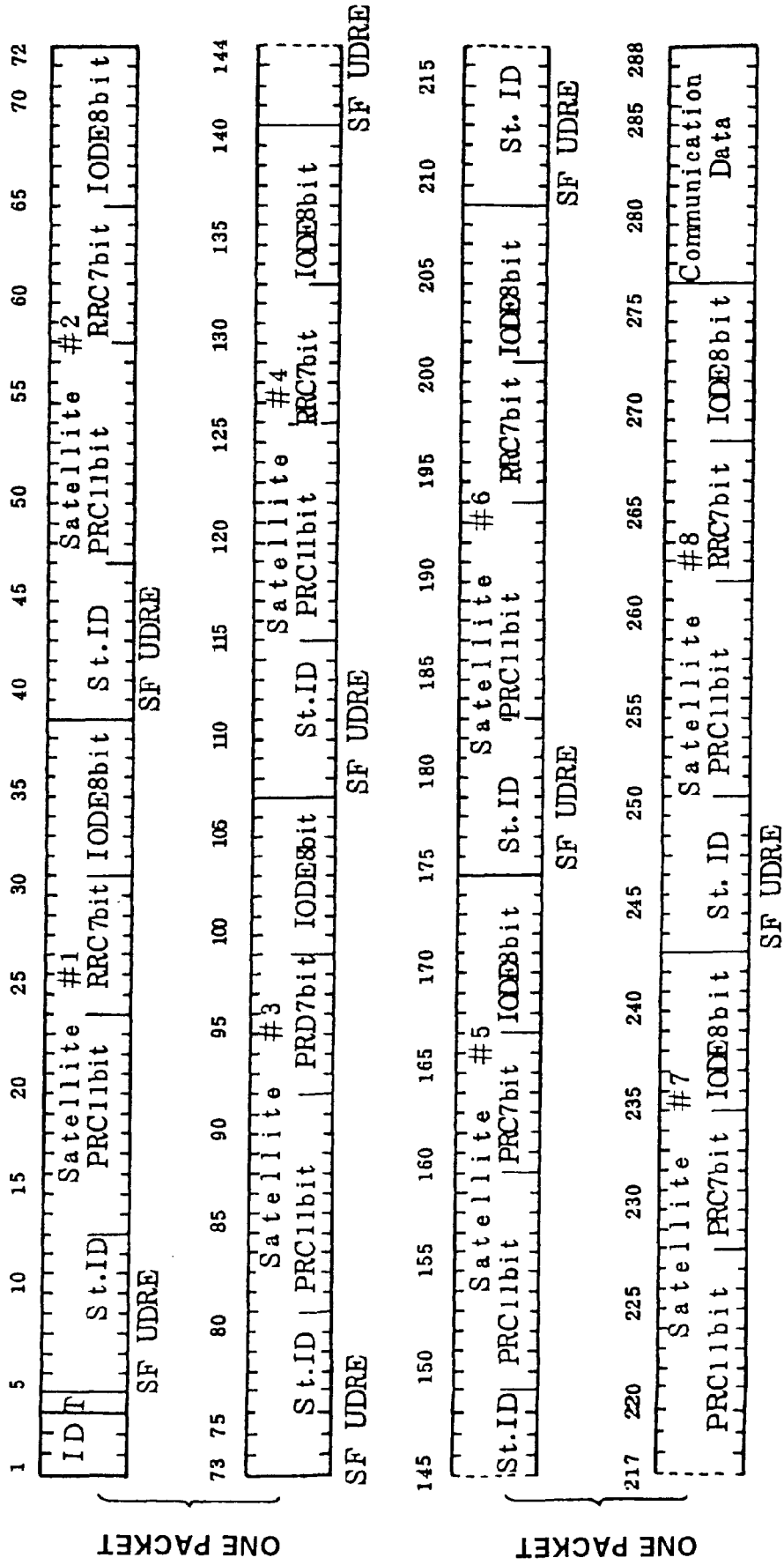
FIG. 2 shows the structure of DGPS data.

The structure of this 288-bit DGPS data is shown in FIG. 2. As shown in the figure, the first bit positions 1 to 3 of correction information for the two packets contain the data ID. The data ID is set as one of six types of "000" to "101", and incremented in sequence from 000. Therefore, correction information that does not fit in the two packets is placed into a packet having a consecutive data ID in the next frame. The reception of correction information completes in the mobile station in six frames maximum (30 seconds).

Time correction T is allocated to bit position 4. This value is determined from the time when correction information was obtained. In concrete terms, it is "0" if the time when correction information was obtained is even, and "1" if the time is odd. DGPS receiver 20, based on the time correction bit T, corrects the time difference with the fixed station that created the correction information. Then, bit positions 5 to 276 represent the correction data, and each of the eight GPS satellites are allocated 34 bits. In other words, bit positions 5 to 38 are allocated to the first satellite (i.e., correction data set number), bit positions 39 to 72 are allocated to the second satellite (i.e., correction data set number), bit positions 73 to 106 are allocated to the third satellite (i.e., correction data set number), and so forth, onto the eighth satellite (i.e., correction data set number). 95% of the time the number of satellites that can observe a point on earth is 8 or less, and the reception of correction information usually completes in one frame. Bit positions 277 to 288 represent the bits for communication data, and the health information of all GPS satellites is allocated to this data area.

FIG. 3 shows the contents of correction data from each satellite. Correction data comprises a scale factor SF (i.e., 1 bit), a user differential range error UDRE (i.e., 2 bits), a satellite ID St. ID (i.e., 5 bits), a pseudorange correction PRC (i.e., 11 bits), a range-rate correction RRC (i.e., 7 bits), and an issue of data IODE (i.e., 8 bits). SF indicates the order of PRC and RRC, UDRE represents the accuracy of the true position obtained using correction data, and St. ID represents the number of a GPS satellite. PRC is a correction value of the pseudorange with each GPS satellite, and is the difference in the pseudorange of the GPS satellite and reference station 10 calculated from the radio wave received from the respective GPS satellite, and the range with the GPS satellite calculated from the true position of reference station 10. In other words, as described above, the correction data calculated at the reference station represents errors $\Delta X$, $\Delta Y$, and $\Delta Z$ with respect to the true position $(X_0, Y_0, Z_0)$ of the GPS measured values $(X_S, Y_S, Z_S)$, and can also be calculated as errors of the pseudorange of the base station with each GPS satellite and the true range. In this embodiment, the errors of the pseudorange with each GPS satellite are transmitted as correction data. RRC represents the rate of the correction value, and the correction value at an arbitrary time is interpolated at DGPS receiver 20 based on PRC and this RRC. IODE is a code that each GPS satellite appends to its orbit data, so that DGPS receiver 20 receiving orbit data matching this code makes it possible to perform correction based on orbit data identical with orbit data that reference station 10 has used.

Therefore, in this embodiment, the correction data for 8 satellites and the health information for 12 satellites are transmitted in 288 bits during 5 seconds for one frame so that the reception of all correction data completes in 30 seconds for 6 frames.

Furthermore, in this embodiment, an adjustment is performed which adds a predetermined adjustment error for pseudorange correction PRC. Therefore, the accuracy does not increase appreciably if the pseudorange correction PRC obtained from FM multiplex data is used directly. On the other hand, this adjustment error has been determined by a predetermined method. The accuracy of the pseudorange correction PRC can be increased by performing corrections for the adjustment error. In other words, the pseudorange correction PRC can be restored to a proper value by adding the adjustment error and the correction value of opposite polarity. Adjustments may be performed for range-rate correction RRC instead of for pseudorange correction PRC. Furthermore, these adjustments may be combined.

With regards to how the adjustment error is determined, there is a one-to-one correspondence with the method of obtaining the correction value at the mobile station. Corrections at the mobile station are described next.

Mobile Station Configuration

Figure 4:
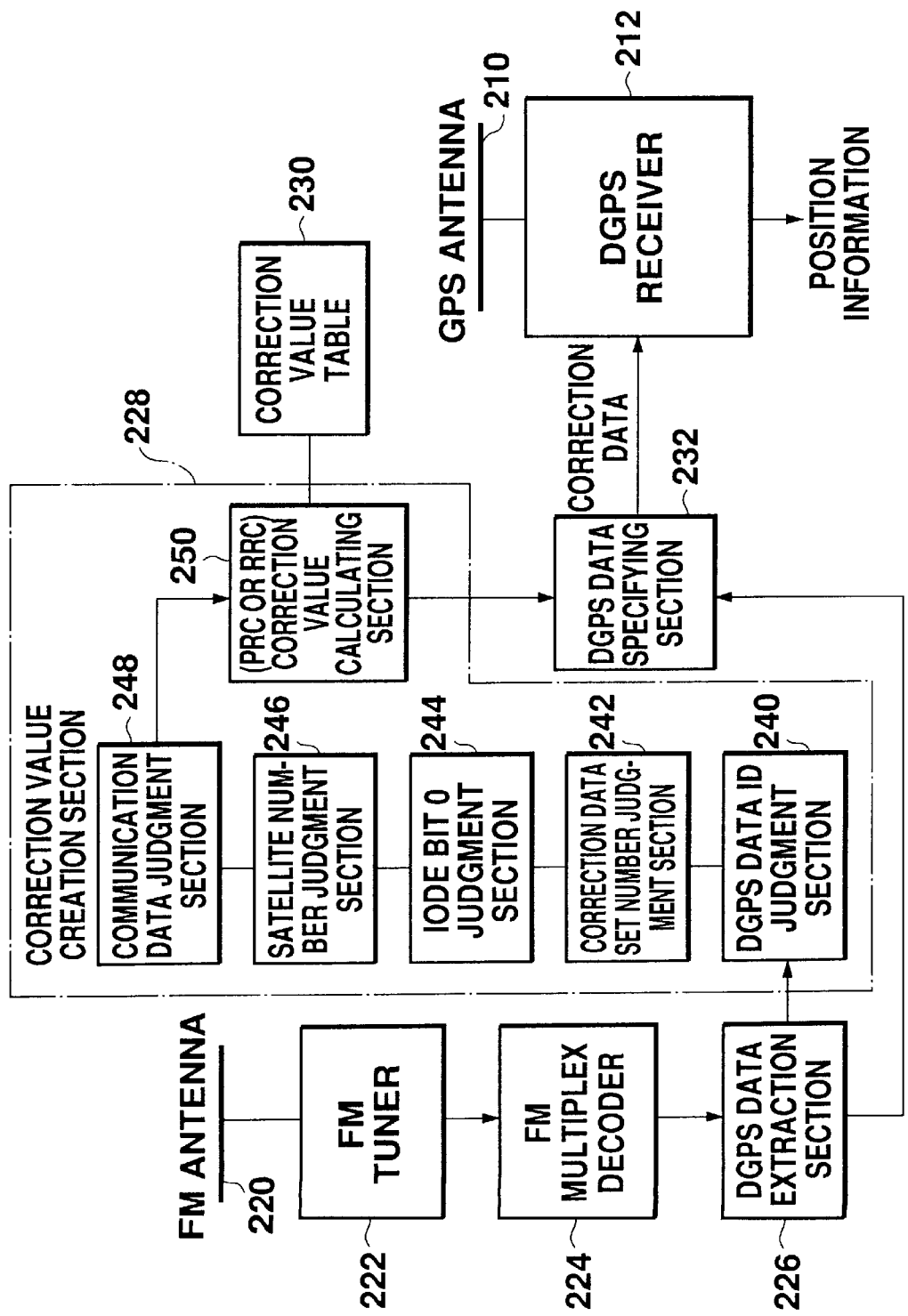
FIG. 4 shows the configuration of a positioning apparatus.

FIG. 4 is a block diagram showing the overall configuration of a positioning apparatus concerning the embodiment wherein a GPS antenna 210 receives radio waves containing satellite transmission information, from a plurality of artificial satellites and supplies them to a DGPS receiver 212. DGPS receiver 212 receives the radio waves obtained from GPS antenna 210 to perform GPS positioning and corrects the information received from each satellite with the DGPS correction data to yield corrected position information of high accuracy.

On the other hand, an FM antenna 220 receives FM broadcast waves and supplies them to an FM tuner 222. FM tuner 222 receives and demodulates FM broadcast waves, and supplies them to an FM multiplex decoder 224. Ordinary audio FM broadcast signals are output and reproduced separately.

FM multiplex decoder 224 extracts a multiplex modulation frequency 76 kHz bandwidth signal and demodulates the obtained multiplex modulated signal according to its modulation method (i.e., DARC method) and demodulates the multiplex signal. The obtained multiplex signal includes various types of information, among which correction information (e.g., DGPS information for correcting information regarding positions supplied from satellites) is included. In other words, the data format of the DARC method FM multiplex DGPS is defined by the Broadcast Technology Association (BTA) in the R-003 standard. A DGPS data extraction section 226 extracts DGPS data (i.e., DGPS information) based on this data format and supplies DGPS data to a correction value creation section 228.

Correction value creation section 228 judges, from the content of one predetermined bit (i.e., adjustment state identification information) within the supplied DGPS data, whether or not the correction data within the received DGPS data has been adjusted. For example, the system determines that the data has been adjusted if the adjustment state identification information is "1" and that it has not been adjusted if the value is "0". If there was an adjustment, a corresponding correction value is read from a correction value table 230, then supplied to a DGPS data specifying section 232. On the other hand, if there was no adjustment, a correction value of "0" is supplied to DGPS data specifying section 232. DGPS data specifying section 232 corrects the correction data by adding the correction value to the correction value supplied from DGPS data extraction section 226, and supplies the corrected correction data to DGPS receiver 212.

Therefore, DGPS receiver 212 uses the corrected DGPS correction data to perform position detection of high accuracy. The adjustment state identification information may have multiple bits to indicate adjustment ranks. For example, if the adjustment state identification information has 2 bits, 4 types of ranks can be set, so that 3 adjustment states, or 3 levels of adjustment errors of large, medium, and small can be set in addition to a non-adjustment state.

In this embodiment, an adjustment is made for degrading the accuracy regarding the obtained correction data at the transmitting side. This adjustment method is predetermined. Only users who have correction means for the adjustment can reproduce the high accuracy correction data and perform position detection having high accuracy.

This adjustment is performed by adding a predetermined adjustment data for correction data of each satellite. Proper correction data can be obtained by storing correction values for this adjustment in a correction value table 230 and adding these to correct the received and adjusted correction data.

Furthermore, according to this embodiment, the adjustments differ depending on (i) satellite number and (ii) the first-bit value of IODE (i.e., issue of data ephemeris) within the correction data. Two correction values are allocated for each satellite, and correction values are specified from the contents of the DGPS data obtained from the received data so that correction value creation section 228 creates the correction values.

Figure 5:
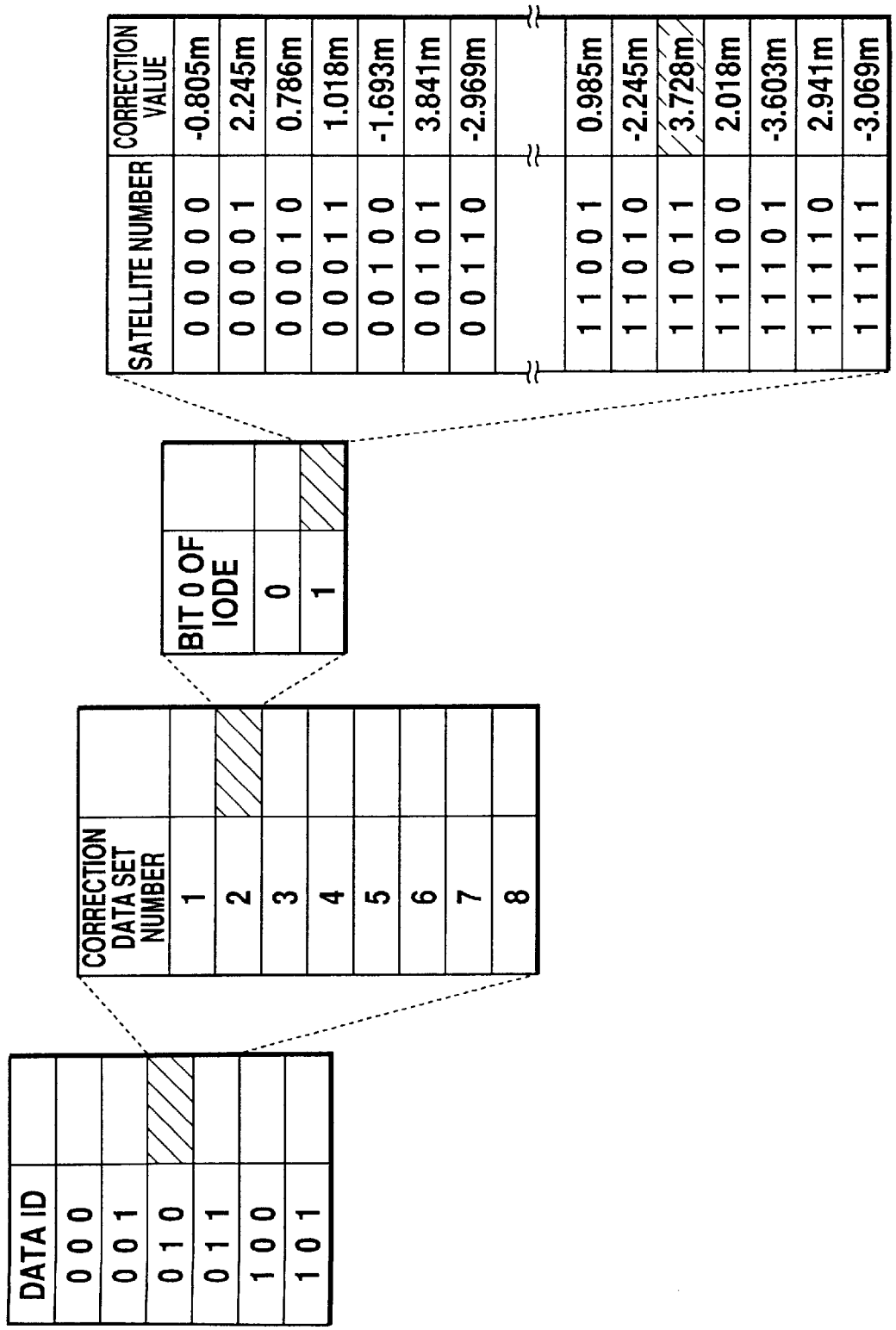
FIG. 5 shows the correction operation in the positioning apparatus.

FIG. 5 shows this operation. First, the data ID is detected from the contents of the DGPS data. In this example, the data ID is "010". Next, one of eight correction data set numbers included in the DGPS data having data ID "010" is selected. One frame usually includes eight correction data sets wherein each is allocated to one satellite. In this example, correction data set number "2" is selected. Next, the first-bit value of IODE within the correction data for correction data set number "2" is judged whether "0" or "1". In this example, the first bit of IODE is "1". Then, for the satellite of correction data set number "2" (i.e., satellite number "11011" in this example), correction value "3.728 m" for IODE "1" is read from correction value table 230 to yield the correction value. For each correction data set number, and for the IODE value within its correction data, the correction values are obtained for the respective satellites.

In this manner, according to this embodiment, only users who know in advance the contents of the correction values, the value of the bit that switches the tables, and the bit that can be tested for adjustment can perform corrections for adjustment. Therefore, correction data of high accuracy can be provided to specific users.

The internal configuration of correction value creation section 228 will now be described. The DGPS data obtained by DGPS data extraction section 226 is supplied to a DGPS data ID judgment section 240. DGPS data ID judgment section 240 judges the distinction among "000" to "101". Next, a correction data set number judgment section 242 judges the correction data set number. Then, an IODE judgment section 244 judges the first-bit value of IODE for each correction data set number (each satellite). Next, a satellite number judgment section 246 detects the satellite number from the satellite ID. Furthermore, a communication data judgment section 248 judges from the value of a predetermined bit within the communication data whether an adjustment has been performed in the DGPS data.

According to the judgment result of communication data judgment section 248, a correction value calculating section 250 outputs a correction value of "0" if it was judged that there was no adjustment. On the other hand, if there was adjustment, the satellite number (St. ID) for each correction data set number and the corresponding correction value according to the IODE value are read from correction value table 230 to yield the correction value for pseudorange correction PRC from each satellite.

The correction value for pseudorange correction PRC of each satellite obtained in this manner is supplied to DGPS data specifying section 232, where it is added to PRC from DGPS data extraction section 226 to restore the pre-adjustment PRC.

While correction value table 230 was prepared in the above-mentioned example, instead, for example, a predetermined calculation method for correction may be stored. Furthermore, while correction values were switched according to the first-bit value of IODE in the above-mentioned example, tables containing correction values may be switched using a multi-bit value, instead of by a single bit, with the number of correction values that can be specified being limited only by the multi-bit value. When performing an adjustment on pseudorange correction PRC, it is also preferable to switch tables for correction values according to an arbitrary bit (or bits) of range-rate correction RRC. This switching may be adopted instead of, or in addition to, the switching based on the value of IODE.

Furthermore, base station 100 and mobile station 200 both recognize absolute time. Time correction T is also allocated to the above-mentioned DGPS data so that both can know the correct time. It is also preferable to switch the table to be used in correction value table 230 according to the time and date. This enables the randomness of the correction value to be further increased.

Base Station Configuration

Base station 100 obtains the adjustment errors in the same procedure described above in FIG. 5 when creating correction data and adds them to the correction data. In other words, instead of the correction values in FIG. 5, adjustment errors having opposite polarities are generated and added to pseudorange correction PRC. The procedure for switching tables according to the first-bit value of IODE is completely the same. When this sort of adjustment is performed, a predetermined bit within the correction data is set to "1" and the obtained DGPS data is transmitted.

Figure 6:
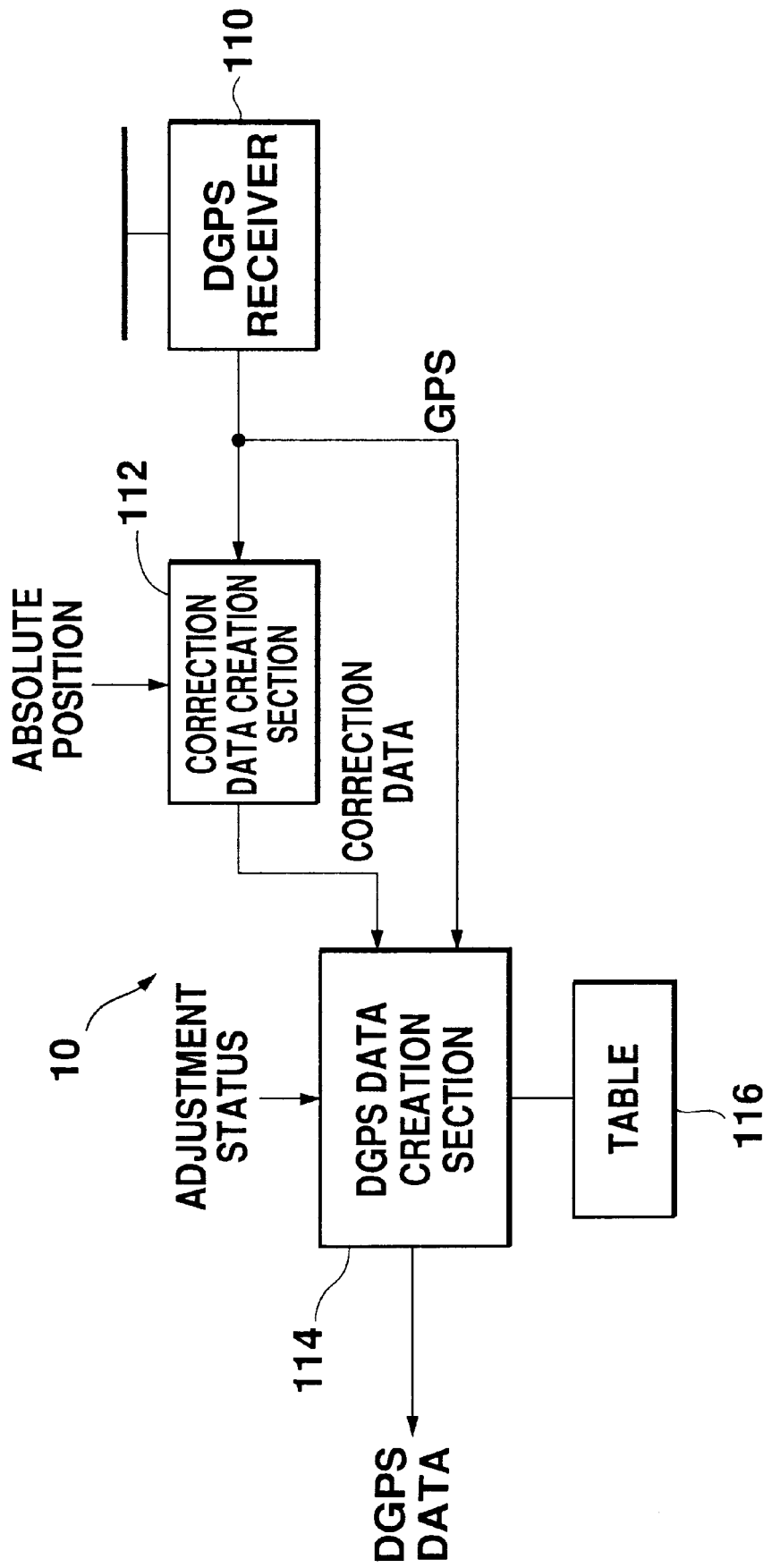
FIG. 6 shows the major sections of base station 100.

Fixed reference station 10 of base station 100, as shown in FIG. 6, for example, consists of a GPS receiver 110, a correction data creation section 112, a DGPS data creation section 114, and a table 116. GPS receiver 110 detects an absolute position based on satellite transmission information from the artificial satellites, and supplies it as GPS data to correction data creation section 112. Correction data creation section 112 calculates the error in the detected position in the GPS data from the reference position data for the site base station 100 as well as creates correction data for supply to DGPS data creation section 114.

DGPS data creation section 114 creates DGPS data based on the correction data. DGPS data creation section 114 references the contents of table 116 which indicate the relationship between data of a predetermined location in the above-mentioned DGPS data and correction values, and creates the adjustment error to adjust the correction data. Whether or not to perform this adjustment is modified, such as by the contents of the service, and identification information, indicating whether or not adjustment was performed is appended as communication data to DGPS data. As shown in FIG. 6, the information indicating the adjustment state is supplied from an external source. In this manner, the DGPS data to be received is created in mobile station 200.

Advantages of the Embodiment

As described above, according to this embodiment, the base station transmits the adjusted correction data in DGPS data. Mobile stations that have the configuration of this embodiment can restore with correction values the adjusted correction data from the base station into proper correction data. Based on proper correction data, position detection of the best accuracy is performed. On the other hand, mobile stations not having the configuration of this embodiment cannot obtain the correction values. In this case, the adjusted correction data will be used directly so that the best accuracy is not obtained even though the accuracy will be higher than when measuring with GPS independently. Through the use of DGPS, varying adjustment accuracy enables the accuracy to be lowered than when measuring with GPS independently or left essentially unchanged.

In particular, according to this embodiment, DGPS services can be divided into ranks without scrambling. Furthermore, it is possible to lower the positioning accuracy as necessary according to the needs of society.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A positioning system comprising:

a fixed station for generating DGPS data including correction data for satellite transmission information transmitted from artificial satellites and adjustment state identification information for indicating a state of adjustment error assignment, said DGPS data being based on said artificial satellite transmission information and an absolute position that is known in advance, said correction data containing at least one of pseudorange correction data and range-rate correction data; and a mobile station for detecting its own position based on said artificial satellite transmission information and said DGPS data that is transmitted from said fixed station, wherein said fixed station assigns a predetermined adjustment error to said correction data and then transmits said DGPS data; and said mobile station corrects said correction data based on the received DGPS data.

2. The system of claim 1, wherein said mobile station corrects the correction data according to the assignment state of the adjustment error.

3. The system of claim 2, wherein said adjustment state identification information indicates at least whether or not adjustment error was assigned, and wherein, when said adjustment state identification information indicates that adjustment error has been assigned, said correction data is corrected according to the adjustment error which is predetermined.

4. The system of claim 3, wherein the value of said predetermined adjustment error is determined according to data at a predetermined location within DGPS data.

5. The system of claim 4, wherein said fixed station and mobile station each have a table that determines the relationship between said data at a predetermined location within DGPS data and a plurality of adjustment errors.

6. The system of claim 1, wherein the value of said predetermined adjustment error is determined according to data at a predetermined location within DGPS data.

7. The system of claim 6, wherein said fixed station and mobile station each have a table that determines the relationship between said data at a predetermined location within DGPS data and a plurality of adjustment errors.

8. A fixed station apparatus for a positioning system using satellite transmission information transmitted from artificial satellites, said fixed station apparatus comprising:

a position detection apparatus for detecting its own position by receiving said artificial satellite transmission information; and a DGPS creation apparatus for creating DGPS data including correction data for various satellite transmission information based on its own absolute position known in advance and its own position obtained from said position detection apparatus and for adjusting the value of said correction data by assigning a predetermined adjustment error, said correction data containing at least one of pseudorange correction data and range-rate correction data.

9. The apparatus of claim 8, wherein said DGPS data creation apparatus assigns to said DGPS data, adjustment state identification information indicating the state of adjustment error assignment with respect to said correction data.

10. The apparatus of claim 9, wherein said adjustment state identification information indicates at least whether or not adjustment error has been assigned.

11. The apparatus of claim 8, wherein said adjustment means determines the adjustment error in accordance with the data contents at a predetermined location within DGPS data.

12. A positioning apparatus for a positioning system using satellite transmission information transmitted from artificial satellites, said positioning apparatus comprising:

a position detection apparatus for detecting its own position based on said artificial satellite transmission information;

a DGPS data creation apparatus for receiving DGPS data transmitted from a fixed terrestrial station, said received DGPS data including correction data for satellite transmission and adjustment state identification information for indicating a state of adjustment error assignment, said correction data containing at least one of pseudorange correction data and range-rate correction data; and a correction data correction apparatus for correcting said received correction data in a predetermined manner, wherein said position detection apparatus corrects, based on correction data that was corrected by said correction data correction apparatus, its own position that was detected according to said artificial satellite transmission information.

13. The apparatus of claim 12, wherein said correction data correction apparatus corrects correction data based on a correction value that has been stored in advance.

14. The apparatus of claim 13, wherein said correction data correction apparatus has a table showing the relationship between data at a predetermined position within DGPS data and a plurality of correction values.

15. The apparatus of claim 12, wherein said correction data correction apparatus identifies, based on said adjustment state identification information the state of adjustment error assignment with respect to correction data, and controls the correction of correction data based on said identified adjustment error assignment.

16. The apparatus of claim 15, wherein said adjustment state identification information indicates at least whether or not adjustment error has been assigned.

* * * * *

UNITED STATES PATENT AND TRADEMARK OFFICE
CERTIFICATE OF CORRECTION

PATENT NO. : 5,990,825
DATED : November 23, 1999
INVENTOR(S) : Ito

It is certified that error appears in the above-identified patent and that said Letters Patent is hereby corrected as shown below:

Title page,

Item [56] References Cited please add under "U.S. DOCUMENTS":
        --5,323,322  6/1994  Muller et al.
        5,155,490  10/1992  Spradley, Jr. et al.--;

please add under "FOREIGN PATENT DOCUMENTS
        --2,197,333  2/1996  Canadian Patent Office--.

Signed and Sealed this

Fourteenth Day of November, 2000

Attest:

Q. TODD DICKINSON

*Attesting Officer*    *Director of Patents and Trademarks*